Dec. 17, 1940.  S. MANDL  2,225,420
WRENCH
Filed June 24, 1938  2 Sheets-Sheet 1
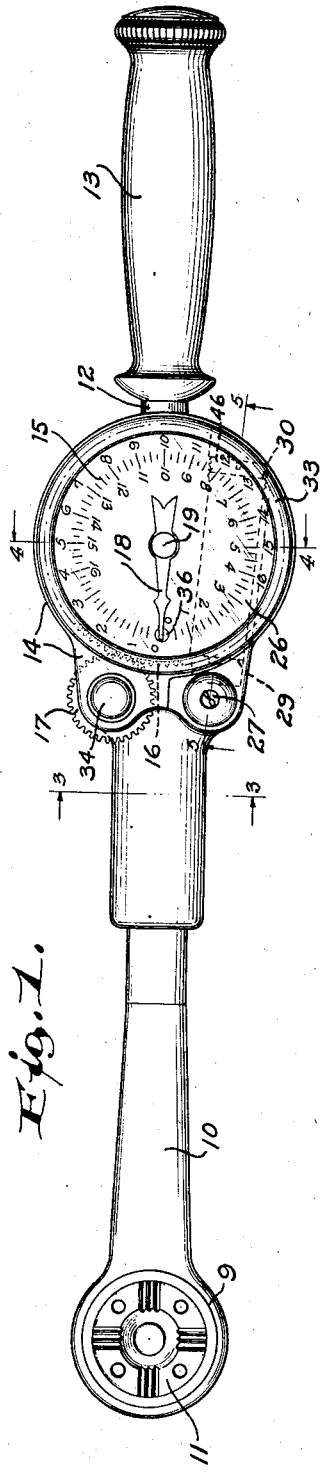
Fig. 1.
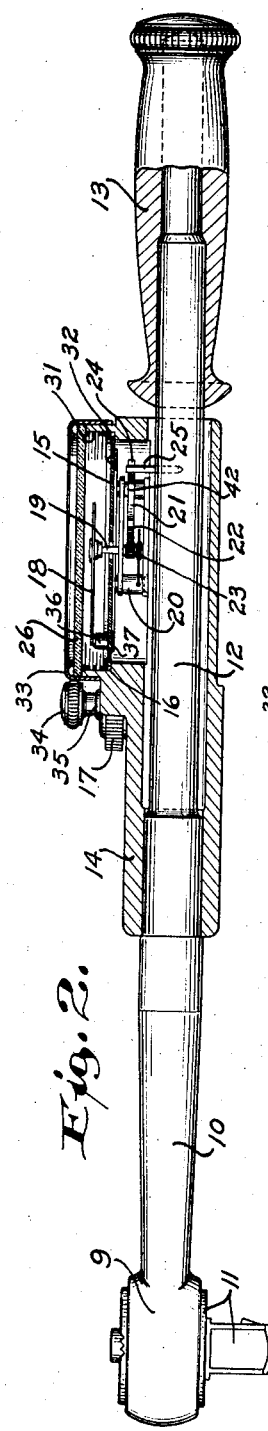
Fig. 2.
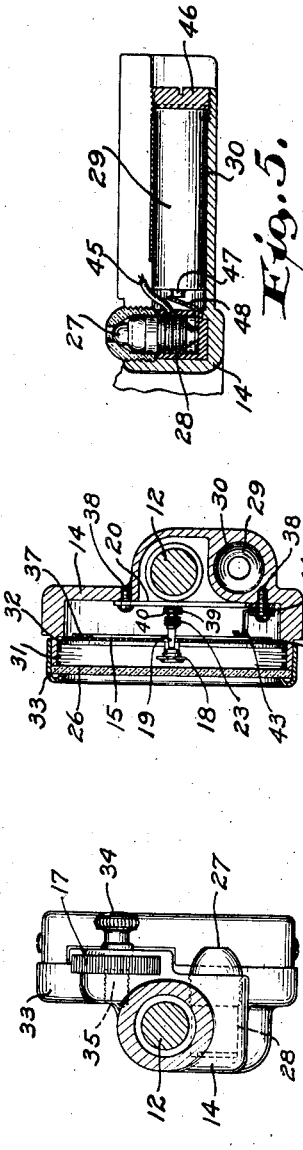
Fig. 5.
Fig. 4.
Fig. 3.
INVENTOR.
S. Mandl
BY
Morsell, Lieber & Morsell
ATTORNEYS

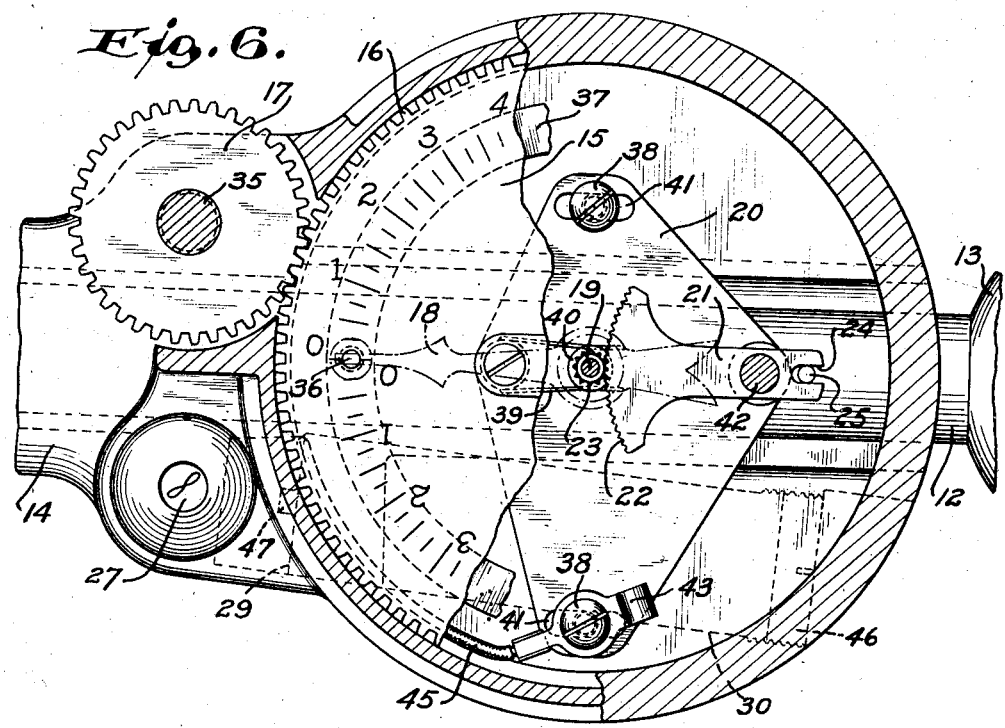
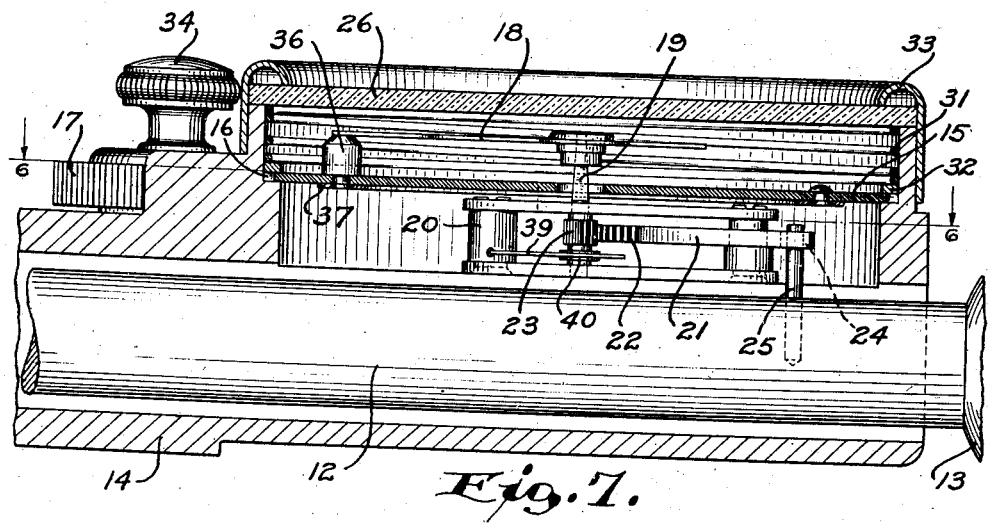

Patented Dec. 17, 1940

2,225,420

UNITED STATES PATENT OFFICE 2,225,420

WRENCH

Siegmund Mandl, Milwaukee, Wis., assignor to Blackhawk Mfg. Co., Milwaukee, Wis., a corporation of Wisconsin Application June 24, 1938, Serial No. 215,622

3 Claims. (Cl. 265—1)

This invention relates to improvements in the construction and operation of so-called torque wrenches wherein means are provided for indicating the force applied during normal use of the toy.

Various types of torque indicating wrenches have heretofore been proposed and used commercially especially for the purpose of showing the operator when a predetermined manipulating force has been applied to the wrench handle. One of the principal purposes of this class of wrench is to prevent subjecting the element to which pressure is being applied, from being subjected to excessive stress, and to enable the operator to apply approximately the same safe and predetermined force to a succession of similar machine elements such as threaded bolts, studs, nuts, taps, threading dies or the like. The prior wrenches of this type were generally provided with a gage and pointer, the latter of which was movable by distortion of the wrench handle to indicate upon the gage plate the pressure or force applied to the work. These prior wrenches therefore depended upon strict observance of the gage and pointer by the operator, in order to gain the advantages obtainable by using the special wrench, and the prior wrenches were therefore practically useless for indicating purposes when utilized in dimly lighted or dark places. Since many of these wrenches are used in garages and by relatively careless operators, their utility has been limited; and it was also relatively difficult with the prior torque wrenches to obtain accurate results and to prevent over-stressing of the elements to which the wrenches were applied, because of the relatively crude and ineffective indicating devices employed therein.

It is therefore an object of the present invention to provide an improved power indicating wrench which is highly efficient in use, and which may be conveniently manipulated and will give accurate indications of performance in relatively dark and inaccessible places.

Another object of my present invention is to provide a new and useful torque wrench wherein distortion of a part of the tool during normal use, is effectively utilized to give a quick indication of the force being applied, by flashing a light when the predetermined limiting force has been reached.

A further specific object of this invention is to provide simple, compact and readily manipulable means for effecting accurate pre-setting of a torque wrench indicating dial, and for giving a signal the moment that the pre-set condition of operation has been reached.

Still another specific object of the invention is to provide a simple, compact and durable indicating wrench assemblage which need not be carefully watched by the user, and wherein the signal will startle the operator into releasing the force and will thereby avoid over-stressing of the manipulated element.

An additional object of my invention is to provide an improved torque indicating wrench which is accurate and sensitive in its indications, and which may be manufactured and sold at moderate cost.

These and other objects and advantages of my invention will be apparent from the following detailed description.

A clear conception of the several features constituting my present improvement, and of the mode of constructing and of utilizing torque wrenches built in accordance with the invention, may be had by referring to the drawings accompanying and forming a part of this specification wherein like reference characters designate the same or similar parts in the various views.

Fig. 1 is an elevation of the complete torque wrench, looking directly at the indicating dial thereof;

Fig. 2 is a part sectional side-view of the wrench, the section having been taken longitudinally through the indicating mechanism and through a portion of the handle;

Fig. 3 is a transverse section through the wrench taken along the line 3—3 of Fig. 1;

Fig. 4 is another transverse section through the wrench taken along the line 4—4 of Fig. 1;

Fig. 5 is a section through the signal light and battery compartment of the wrench, taken along the line 5—5 of Fig. 1;

Fig. 6 is an enlarged fragmentary part sectional elevation of the indicating dial, the sectional being taken along the irregular line 6—6 of Fig. 7; and Fig. 7 is a similarly enlarged longitudinal central section through the indicating mechanism.

While the invention has been shown and described as being specifically embodied in a torque wrench of a particular type having a signal light and a special type of dial adjustment, it is not intended to thereby unnecessarily restrict the scope.

Referring to the drawings, the improved wrench shown therein comprises in general a socket 9 having a relatively stiff and thick actuating portion 10 rigidly associated therewith and having a ratchet driving member 11 rotatably supported therein; a relatively flexible rod portion 12 of reduced diameter extending away from the rigid portion 10 and having an operating handle 13 secured to the free end thereof; a frame 14 firmly secured to the end of the actuating portion 10 remote from the socket 9 and loosely embracing and enclosing the flexible stem portion 12; a calibrated gage plate 15 rotatably supported upon the frame 14 and having peripheral teeth 16 engageable with the teeth of an adjusting pinion 17 which is journalled in the frame 14; a pointer 18 secured to a shaft 19 which is journalled in a subframe 20, centrally of the gage plate 15; a lever 21 journalled at its medial portion for oscillation upon the subframe 20 and having at one end a toothed segment 22 meshing with a pinion 23 secured to the shaft 19, and being provided at its opposite end with a slot 24 slidably engaging a pin 25 secured to the flexible rod portion 12; a transparent closure 26 for the gage plate 15 and pointer 18; a flash light bulb 27 mounted in a socket 28 secured to the main frame 14 adjacent to the adjusting pinion 17; and a battery 29 mounted in a recess 30 in the main frame and being connectible with the bulb 27 to illuminate the same under certain conditions of operation of the wrench.

The socket 9 need not necessarily be of the ratchet type, but may be of any other desired formation, and the socket and bar portions 10, 12 may be formed either of one piece of stock or of several pieces rigidly connected to each other in any suitable manner. The handle 13 may be formed for convenient gripping, and may be attached to the free end of the reduced rod portion 12 in any desired manner. The main frame 14 which is firmly attached to the enlarged rod portion 10, does not contact directly with the flexible rod portion 12, so that the reduced portion 12 may deflect laterally when the socket 9 is associated with the work and a pull is applied to the handle 13. The gage plate 15 which may be calibrated or graduated in any desired manner, is rotatably confined within a bore of the main frame 14 by means of a coil spring 31, the outer end of which coacts with the glass closure 26 and the inner end of which presses against a washer 32 which in turn engages the toothed peripheral portion of the plate 15 so as to protect and confine the teeth 16 while permitting free rotation of the plate 15 with the aid of the pinion 17. The transparent closure 26 is normally held in place by means of a retainer ring 33 coacting therewith and removably attached to the frame 14, so as to provide a sealed enclosure for the dial; and the pinion 17 which meshes with the teeth 16 of the gage plate 15, is journalled upon a fixed stud 35 and is rotatable by direct application of a finger or thumb to the teeth thereof. The pinion 17 may be locked in adjusted position by means of a clamping knob 34 coacting with the stud 35 and with the main frame 14. It should be noted, that while the teeth 16 and those of the pinion 17 are of the spur type, these teeth may be of the spiral or worm type if a self-locking arrangement is desired.

The gage disk or plate 15 is preferably formed of insulating material, and is provided with an upwardly projecting contact post 36 located at the zero graduation and adapted to be engaged by the tip of the pointer 18; and also has secured to the inner face thereof a flat conductor ring 37 to which the post 36 is attached. The supporting shaft 19 for the pointer 18 does not contact the gage plate 15 but is journalled for rotation in the subframe 20 which is firmly attached to the main frame 14 by means of screws 38, and the rotation of the shaft 19 may be slightly retarded by a friction spring 39 secured to the frame 20 and coacting with a hub 40 carried by the pointer shaft. The screws 38 coact with slots 41 in the frame 20 so as to permit adjustment of the subframe relative to the main frame 14 for the purpose of properly positioning the pivot pin 42 of the lever 21, and one of the screws 38 serves to clamp a stationary resilient contact 43 in position so that this contact will constantly engage the conductor ring 37. The fixed contact 43 is insulated from the screw 38 and frames 14, 30 by means of bushings 44, and is connected to the lamp socket 28 by an insulated lead 45, see Figs. 5 and 6. The flash light battery 29 is confined within the frame recess 30 by a removable plug 46, and has its outer casing in direct electrical contact with the frame 14, while the battery terminal 47 engages a resilient contact plate 48 with which the lower end of the bulb 27 coacts as clearly shown in Fig. 5. The arrangement is obviously such, that when the pointer 18 engages the contact post 36, the bulb 27 will be illuminated, and the disk or plate 15 should ordinarily be so positioned that such completion of the electric circuit will not be maintained for any great length of time.

During normal use of my improved torque wrench, and assuming that it is desirable to apply a succession of nuts to studs with a predetermined degree of torque or pressure, the gage plate 15 should first be adjusted either to the right or left of the normally fixed point of the pointer 18, by releasing the knob 34 and manipulation of the pinion 17. If the wrench is to cooperate with elements which require movement of the handle 13 in a clockwise direction as viewed in Fig. 1, then the gage plate 15 should be shifted in a counterclockwise direction about the axis of the shaft 19, and vice versa. When the desired graduation of the dial has been brought into registry with the pointer 18 and the pinion 17 has been locked with the aid of the knob 34, the wrench may be applied to the work and a pull may be exerted upon the handle 13. As the resistance set up by the work becomes sufficient to cause the flexible rod portion 12 to bend, the pin 25 coacting with the slot 24 in the lever 21, will swing this lever about its pivot pin 42 thereby causing the toothed segment 22 to rotate the shaft 19 and pointer 18 through the pinion 23. When this bending distortion becomes sufficient to cause the pointer 18 to contact the post 36, the electric circuit is completed and the bulb 27 is immediately illuminated, thus indicating to the operator that the desired maximum force has been applied. The successive nuts may thereafter be similarly applied and driven home with equal tension or force, and the sudden illumination of the bulb 27 whenever the predetermined maximum force has been applied, has a startling effect upon the manipulator of the wrench and causes him to release the pressure immediately when the light is flashed.

From the foregoing description it will be apparent that the improved torque wrench may be utilized to accurately predetermine the force which should be applied to perform a certain piece of work, and that the same results may be duplicated as often as desired. The flashing of the light makes it unnecessary for the operator to carefully observe the dial when the gage plate 15 has been properly set, and also makes it possible to utilize the tool in dark or dimly lighted places, or in case obstructions are located directly above the dial. While the use of an electric light has been found to be a simple and effective means for startling the operator into releasing the force and thus preventing over stressing, this light may obviously be replaced by any other startling means such as a mild shock coil or a bell signal, without the exercise of invention. The initial or normal position of the pointer 18 may be accurately fixed by adjustment of the subframe 20 with the aid of the screws 38 and slots 41, and the dial is readily accessible upon removal of the retainer ring 33. The dry-cell or battery 29 may be conveniently replaced upon removal of the plug 46, and the light bulb 27 may also be readily removed. It should be noted that the fixed resilient contact 43 coacting with the contact ring 37 insures continuity of the electric circuit to the post 36 regardless of the position of adjustment of the gage plate 15, and the bulb 27 will be illuminated immediately upon engagement of the pointer 18 with the post 36. The improved wrench has proven highly satisfactory in actual use, and presents a neat appearance and can obviously be manufactured at moderate cost.

It should be understood that it is not desired to limit this invention to the exact details of construction or to the precise mode of use, herein shown and described for various modifications within the scope of the appended claims may occur to persons skilled in the art.

I claim:

1. A portable torque wrench comprising, a work engaging member, a handle member for actuating said work engaging member, a deflectable connection between said members, a frame carried by one of said members and extending along said connection toward the other member, a graduated circular dial adjustable upon said frame and having thereon a normally fixed electrical contact definitely located with respect to the dial graduations, means coacting with the periphery of said dial for effecting adjustment thereof and of said contact about the central dial axis, a pointer swingable about said axis upon deflection of said connection and constituting the movable contact for completing an electric circuit, and an electric signal carried by said frame near said dial and being operable upon completion of said circuit by said pointer.

2. A portable torque wrench comprising, a work engaging member, a handle member for actuating said work engaging member, a deflectable connection between said members, a frame carried by one of said members and extending along said connection toward the other member, a graduated peripherally toothed circular dial adjustable upon said frame and having thereon a normally fixed electrical contact definitely located with respect to the dial graduations, a pinion coacting with the peripheral teeth of said dial to effect adjustment thereof and of said contact about the central dial axis, a pointer swingable about said axis upon deflection of said connection and constituting the movable contact for completing an electric circuit, and an electric light carried by said frame near said dial and being illuminable upon completion of said circuit by said pointer.

3. A portable torque wrench comprising, a work engaging member, a deflectable connection secured to said member and having a handle remote from said member, a frame carried by said member and extending along said connection toward said handle, a peripherally toothed graduated circular dial adjustable upon said frame and having thereon a normally fixed electrical contact disposed near the zero graduation of said dial, a pinion coacting with the peripheral teeth of said dial to effect adjustment of the dial and contact about the central dial axis, a pointer swingable about said axis upon deflection of said connection and constituting the movable contact for completing an electric circuit, an electric light carried by said frame near said dial and being illuminable upon completion of said circuit by said pointer, and a battery for illuminating said light housed within said frame.

SIEGMUND MANDL.